United States Patent [15] 3,673,568
Terry [45] June 27, 1972

[54] TIME DIVISION DATA TRANSMISSION SYSTEM HAVING INTERROGATION SIGNAL PASSED THROUGH MATRIX SWITCHES TO JUNCTORS VIA ALL FREE PATHS

[72] Inventor: John Brian Terry, Maldon, England

[73] Assignee: The Marconi Company Limited, London, England

[22] Filed: April 8, 1970

[21] Appl. No.: 26,732

[30] Foreign Application Priority Data

April 14, 1969 Great Britain........................19,090/69

[52] U.S. Cl.........................340/147 R, 179/18 R, 340/147 T, 340/166 R

[51] Int. Cl.......................H04q 9/00, H04j 3/00, H04m 3/00

[58] Field of Search.............179/18 R, 18 ZZ, 18 AB, 18 GF; 340/147 T, 166

[56] References Cited

UNITED STATES PATENTS

| | | | |
|---|---|---|---|
| 3,324,249 | 3/1964 | Cotroneo et al. | 179/18 |
| 3,390,236 | 6/1968 | Lawrence | 179/22 |
| 3,461,242 | 8/1969 | Inose et al. | 179/15 AQ |
| 3,573,381 | 4/1971 | Marcus | 340/166 |

*Primary Examiner*—Donald J. Yusko
*Attorney*—Baldwin, Wight and Brown

[57] ABSTRACT

A time division multiplex data transmission arrangement has means for applying path interrogation signals to the free row inputs of the device interconnection switches, a switch units wherein each switch has an interrogation signal row and means for detecting the occurrence of an interrogation signal on any row input this signal being passed to all column outputs of the switch which are free whereby the interrogation signals pass to the next switches connected to the switch unit output columns such that the signals pass progressively through the switches of the switch unit until they appear via all free paths at the junctors.

17 Claims, 4 Drawing Figures

Figure 1:
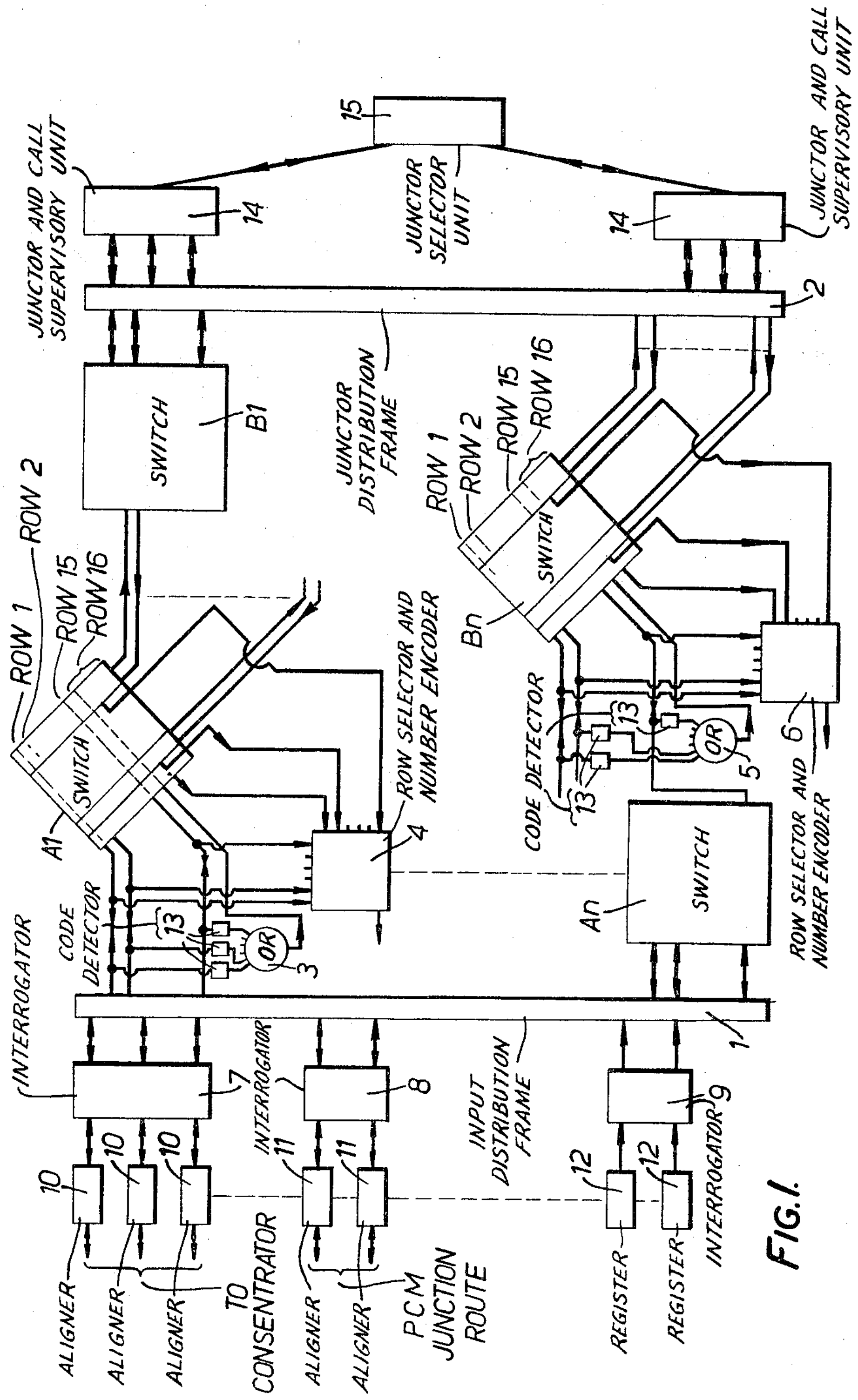

INVENTOR
John Brian Terry
BY
Baldwin Wight Diller & Brown
ATTORNEYS

INVENTOR
John Brian Terry
BY
Baldwin Wight Diller & Brown
ATTORNEYS

INVENTOR
John Brian Terry
BY
Baldwin Wight Diller & Brown
ATTORNEYS

INVENTOR
John Brian Terry
BY
Baldwin Wight Diller & Brown
ATTORNEYS

TIME DIVISION DATA TRANSMISSION SYSTEM HAVING INTERROGATION SIGNAL PASSED THROUGH MATRIX SWITCHES TO JUNCTORS VIA ALL FREE PATHS

The present invention relates to time division multiplex data transmission arrangements employing digital signals, for example pulse code modulated telephony signals, and, more particularly, to such arrangements including a switch unit comprising a plurality of cross point matrix switches whereby a desired connection between two devices connected to the switch unit may be set up, the interconnection between the cross point switches of the unit being such that there are a plurality of paths which may be set up in the said unit to provide the desired connection.

It is common for such switch units to employ an input distribution frame to which all the devices to be interconnected by the unit are connected and to which the crosspoint switches of the unit are connected such that the devices are connected to a plurality of crosspoint switches; a junctor distribution frame to which the crosspoint switches are connected; and a plurality of junctors connected to the junctor distribution frame; during operation a connection path between two devices extending from one to the devices through the input distribution frame, one or more crosspoint switches, the junctor distribution frame, a junctor, back through the junctor distribution frame, one or more crosspoint switches, the input distribution frame, to the other device. Such switch units will be hereinafter referred to as switch units of the kind specified.

The junctors employed may comprise fixed delay or variable delay junctors in addition to zero delay junctors such that the signals from the two devices in a connection may originate in the same time slot or in different time slots of the time divided frame.

When a large number of interconnection paths are likely to be required at the same time then a switch unit of the kind specified having two stages of crosspoint switches may be employed with the rows of the first stage of switches connected to the input distribution frame and the columns of the first stage of switches connected to the rows of the second stage of switches, with each switch of the second stage being connected to all of the switches of the first stage and the columns of the second stage of switches being connected to the junctor distribution frame.

In time division multiplex arrangements employing switch units of the kind specified when a connection between two devices attached to the switch unit is required it is common to utilize a data processor to determine which paths are free. This function of the processor is usually only one of a number of functions which the data processor is required to carry out and it would obviously be preferable if the available free paths could be obtained without the aid of the processor since this would free storage capacity and processor time for other purposes or, alternatively, it would enable a smaller store or processor to be used.

The invention seeks to provide a time division multiplex switching arrangement in which an interrogation arrangement is provided to discover the available free paths for use in setting up an interconnection between two devices, the interrogation means determining the paths without using processing of information by the processor.

According to this invention a time division multiplex data transmission arrangement comprises means for generating path interrogation signals and for applying these signals to the free row inputs of the switches directly connected to the devices to be interconnected, a switch unit of the kind specified wherein each of the crosspoint matrix switches has in addition to its normal signal traffic carrying row an extra row for carrying interrogation signal traffic and means for detecting the occurrence of an interrogation signal on any row input to the switch and for passing this signal via said extra row to all column outputs of the switch which are free in that time slot whereby the interrogation signals are passed to the next switches connected to the switch unit output columns or to junctors connected to those columns such that the signals are passed progressively through the crosspoint switches of the switch unit until they appear via all free paths at the junctors.

Preferably the interrogation signals fed to the inputs of the switch unit connected directly to the calling device will differ from those connected to the inputs of the called device such that if a junctor receives the two signals in the appropriate time slots to allow the path to be set up therethrough it can inform supervisory equipment therefor that it is available for use in setting up an interconnecting path.

Preferably the means for detecting the occurrence of an interrogation signal on any row input and for passing this signal to the extra row comprises an interrogation signal decoder for each input row and a gate to which outputs of all the interrogation code detectors are connected, the output of the gate being connected to said extra row and the detectors being arranged, if they detect the occurrence of an interrogation code or codes to pass the code or codes via said gate to the extra row.

Preferably the different calling and called interrogation codes are such that they can be added or combined whilst still retaining their individual identities to enable their presence to be detected and if the code detectors detect the presence of both signals said gate is arranged to add the two signals and pass the combined signal to said extra row.

Preferably the interrogation signals are provided in normal information signal carrying digit positions via the digital word used in carrying traffic through the transmission arrangement, the normal digital word having in addition to information signal traffic digit positions an additional digit position which is utilized solely for providing control and identifying information within the switch unit, a predetermined one of the binary digits in this additional digit position indicating that the succeeding traffic digits contain an interrogation signal or mark. This extra digit is not concerned with signalling information of the kind, for example, arising from the dialled information and which is to be transferred completely through the transmission arrangement but is solely concerned with control information for use in the switch unit of the kind specified.

In addition to being advantageous to provide at the junctors indications of the free paths thereto from the devices to be interconnected, it would be advantageous to enable a selection of the junctor to be used in setting up a path to be made without the assistance of the processor. For this purpose preferably junctors selection means is provided in association with said interrogation arrangement the junctor selection arrangement comprising means for passing availability mark signals from junctors utilizable in the path to a selector arrangement comprising two or more stages of selector units the final stage of which comprises a single selector unit, the availability marks from the junctors being effectively OR-gated through the stages of selector units until they reach said single selector unit which is arranged such that when it receives a junctor availability mark it scans the inputs thereto and selects the first input on which it detects an available mark, locks on this input and sends to the selector to which that input corresponds an indication that it has been chosen, this process being repeated at each of the stages of selector units until supervisory equipment for an individual junctor receives notification that it has been chosen for use in the interconnection path.

When making a junctor selection, firstly zero delay junctors will be considered, then fixed delay junctors and finally variable delay junctors. In one way of effecting this, only zero delay junctors may put up marks for a first period of time, then if no zero delay junctors put up a mark, for a second period of time fixed delay junctors will signal and again, if no fixed delay junctor puts up a mark, variable delay junctors will put up a mark in a third period of time, it being arranged that if a mark is received in any of the periods of time the junctor selection will take place prior to the occurrence of the next time period and means will be provided such that any subsequent marks due in this next time period are not put up.

Alternatively, a faster selection may be obtained at the expense of using slightly more complicated circuitry. In this arrangement firstly the zero delay junctors send availability marks if any are free. In the event that no mark is received at the last selector unit it causes a signal to be sent back through all the selector switches to the junctors, the signal being sent in a particular time slot and causing any available fixed delay junctors to immediately put up marks. Finally if no fixed delay junctors put up marks the final selector sends a signal back through the selection arrangement to all the junctors in a second pre-determined time slot which results in any available variable delay junctors sending up marks.

Figure 2:
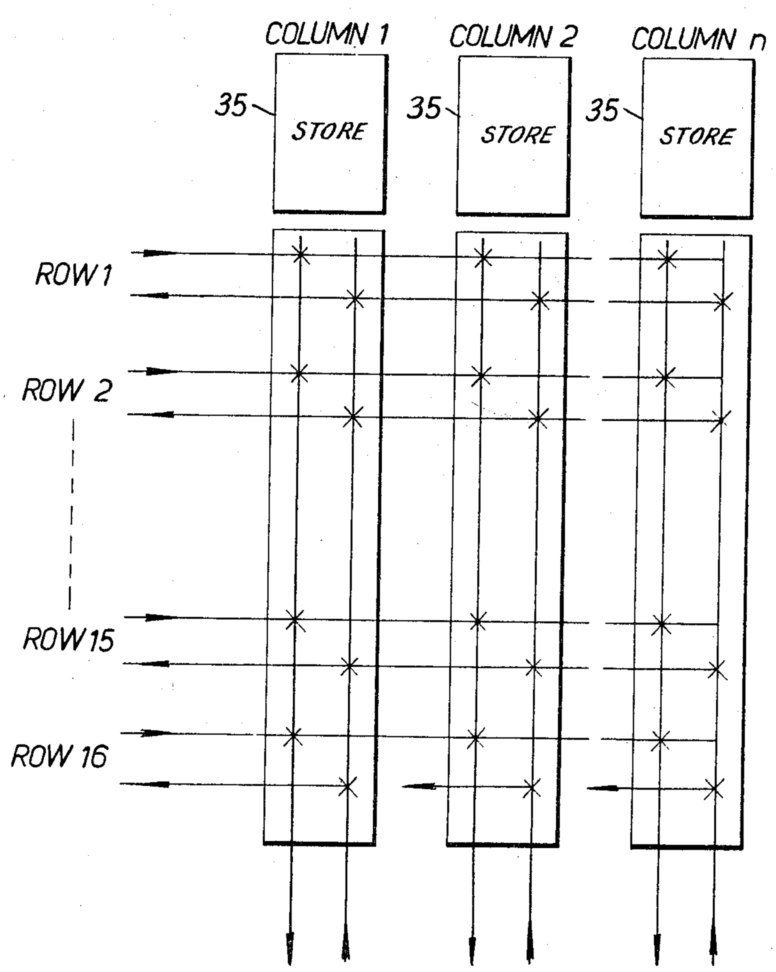
Figure 3:
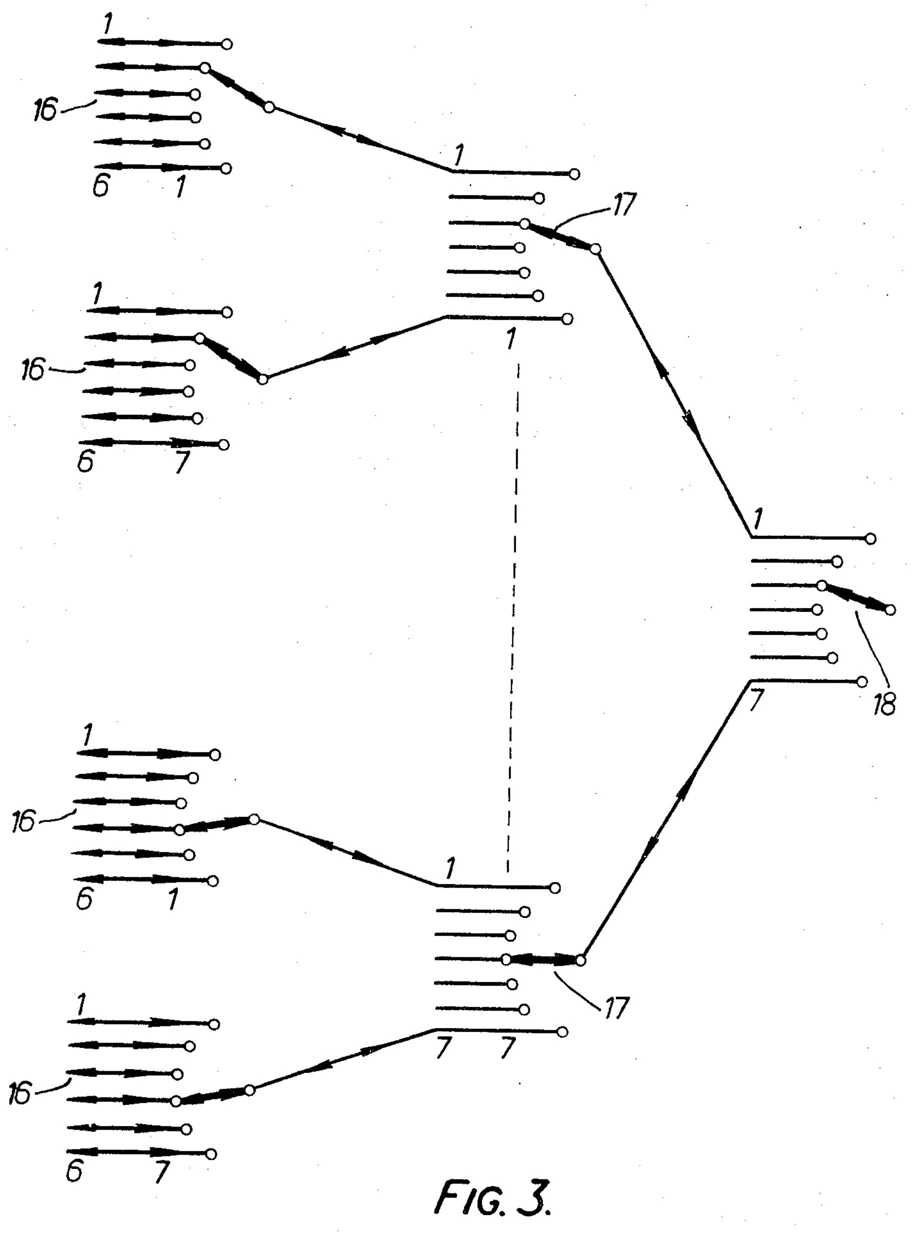
Figure 4:
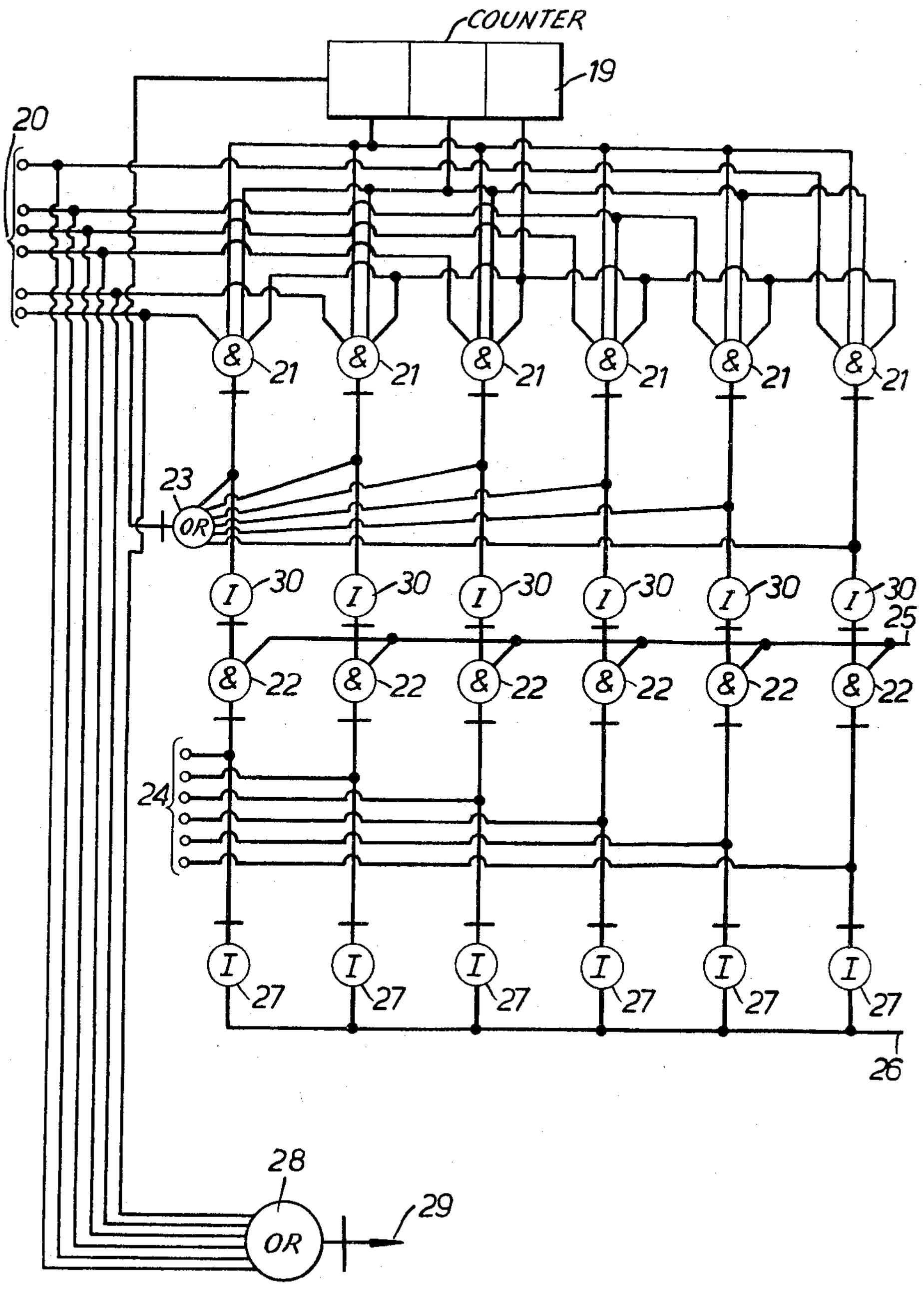

A time division multiplex switching arrangement in accordance with the invention is, by way of example, illustrated in the accompanying drawings in which:

FIG. 1 shows a block diagrammatic representation of a time division multiplex switching arrangement in accordance with the invention and forming part of a telephone network, FIG. 2 shows diagrammatically a crosspoint matrix switch used in the arrangement of FIG. 1, FIG. 3 shows diagrammatically junctor selector equipment for use in the arrangement of FIG. 1, and FIG. 4 shows diagrammatically but in more detail one of the junctor selector units of FIG. 3.

Referring to FIG. 1 there is shown a time division multiplex switching arrangement forming part of a telephone network and comprising a switching unit of the kind specified having a plurality of so-called A switches and B switches; only two of each of which are shown, the A switches being referenced A1 and An and the B switches being similarly referenced B1 and Bn to indicate that each pair of switches are the first and nth switches of n similar switches. The A switches and B switches are crosspoint switches each having 15 rows and 15 columns of signal traffic and each having a sixteenth row for path interrogation and setting purposes. The inputs and outputs of the rows of the A switches are connected to an input distribution frame 1 and the inputs and outputs of the columns of the B switches are connected to a junctor distribution frame 2.

There is full interconnection between the inputs and the outputs of the columns of the A switches and the inputs and outputs of the rows of the B switches: thereby signals from any A switch may be fed to any B switch and vice versa. The full interconnection is not represented in FIG. 1 there being shown only one A switch to B switch link and B switch to A switch link extending from A switch A1 to B switch B1, the remaining interconnections not being shown for the sake of clarity. For the same reason only a few rows and columns are indicated diagrammatically in A switch A1 and B switch Bn, and path selection equipment which is required for each switch has only been shown for A switch A1 and B switch Bn.

This path selection equipment includes for A switch A1 interrogation mark transference means in the form of an OR gate 3 having an input from each row input of the A switch with a code detector 13 in each OR gate input and having its output connected to the 16 row input of the A switch. In addition, the path selection equipment includes a row selector and row number encoder 4, connected to receive inputs from each input row of the A switch and from each column 16 row output, the encoder output being fed to path setting equipment (not shown) for the A switch.

The B switch employs similar equipment constituted by an interrogation mark transference OR gate 5, code detectors 13 in each input and a link selector and row number encoder unit 6. The inputs of the OR gate 5 are connected via the code detector 13 to the B switch input rows and its output is fed to the 16 input row. Each input row and each column 16 row output is connected as an input to the link selector unit 6 and the output from unit 6 is fed to path setting equipment (not shown) for the B switch.

All of the A and B switches have similar equipment.

The A switches are connected via the input distribution frame to a number of interrogators only three of which are shown, these being referenced 7, 8 and 9. The number of interrogators provided will, of course, depend upon the size of the telephone exchange. Interrogator 7 is connected to three aligners 10 each receiving input from and feeding its output to a concentrator (not shown). Interrogator 8 is connected to a plurality of aligners 11, two of which are shown and each of which receives input from and feeds output to a P.C.M. junction route. Interrogator 9 is connected to a plurality of registers 12, two of which are shown. The B switches are connected via the junctor distribution frame 2 to a plurality of junctor and call supervisory units 14 although again only two are shown, for the sake of simplicity. The blocks are much simplified diagrammatic representations and each block contains zero delay, fixed delay and variable delay junctors, call supervisory units therefor and a final junctor selector unit therefor. A junctor selector unit 15 which may comprise one or two stages depending upon the size of the exchange is connected by two-way highways to the junctor selectors of each of the units 14.

FIG. 2 shows diagrammatically and in greatly simplified form a crosspoint switch of the kind used for each A or B switch of the arrangement of FIG. 1. The switch has 16 rows each with an input cross connection and an output cross connection, 15 columns each with an input cross connection and an output cross connection, and control means (not shown) which may be utilized to effect crosspoint connections between any column input and output to any row input and output. The input cross connection for the 16 row is a single cross connection such that any input applied to it may be extracted from any column. The output cross connection for the 16 row is such that there are 15 outputs, one for each of the 15 P.C.M. traffic columns, each of which outputs is connected to an input of the switch encoder and selector units 4 or 6. Associated with each column there is a crosspoint column store 35 as shown at the top of each column in FIG. 2. These stores contain the information required to set the crosspoints associated with that column in the different time slots of the time divided frame.

FIG. 3 is a diagrammatic representation of the junctor selector equipment. There are a plurality of first stage selectors 16, each of which constitutes a part of the arrangement referenced 14 in FIG. 1, a plurality of second stage selectors 17 and a single final selector 18. The final selector serves seven second selectors, each second selector serves seven first stage selectors and each first stage selector serves three junctors there being two inputs to each first stage selector for each of its junctors, one for called signal traffic passing through the junctor one way and calling signal traffic passing the other way and the other input for the reverse signal traffic directions.

The time division multiplex switching arrangement of FIGS. 1 to 3 operates as follows:

When, in the telephone network, a transmission path is required to be set up between a calling subscriber and a called subscriber, the interrogator at the calling end and the interrogator at the called end are instructed to transmit interrogation marks or code signals into the system. For example, in the first stages of setting up a call between two subscribers the calling subscriber has to be connected to a register and for this purpose interrogation marks would be transmitted by interrogator 7 and interrogator 9. The interrogators send one of two particular interrogation codes, the calling interrogator transmitting a signal code 01X and the called interrogator the signal 0X1. These signals will be sent in the digital word length used in carrying traffic through the data transmission arrangement. In this case the word length is ten digits, the first of which is for control information associated with the switch, the next eight are for signal information and the last digit is for control information apertaining to the call but originating externally to the switch unit environment and for use outside this environment, e.g. for dialling information.

In the two codes given above, the first digit shown is the first digit of the ten bit digital word and the "0" in the first digit indicates that the subsequent eight signal information digits contain interrogation marks, i.e. 1X or X1. A "1" in the first digit position indicates the presence of signal information in the subsequent eight digits. In free time slots these interrogation code signals are fed via the input distribution frame 1 to the A switches. The occurrence of an interrogation mark on an A switch row input is detected by the associated code detector 13 which then passes the total code, i.e. 0X1 or 01X to the OR gate 3 for the interrogation mark to be passed thereby to the sixteenth row input. The OR gate 3 is designed to pass either code but if both codes are present the gate will add the two codes and pass the signal 011 to the sixteenth row input. This signal 011 still contains both interrogation codes either of which is recognizable. The column stores of the switches are recirculatory stores and have stored therein information indicating which rows should be connected to which columns in each time slot of the time divided multiplex frame.

If a column store has any unallocated or free time slot positions in which it has no signals stored indicative of a required signal path connection then the column control store has a free slot code 0000 stored therein at each of these free time slot locations. When, during the cycling of the store the code 0000 is detected at one or more columns, then the associated column outputs are output is connected to the 16 row input and if there is an interrogation mark on this row it will appear on all of the associated column outputs and will be connected to those B switch inputs to which these column outputs are connected.

Similarly in the B switches the interrogation marks are again fed by the detector 13 and OR gates 5 to the 16 row inputs of the switches and a similar process occurs so that the interrogation marks are passed via the free B switch column outputs to the junctor distribution frame and thence to the junctors which are free for use during that time slot.

As previously mentioned, there are three different types of junctor, zero delay junctors, fixed delay junctors and variable delay junctors. As implied by the name, a zero delay junctor provides no delay between the input signals thereto and output signals therefrom in either direction. A fixed delay junctor causes a fixed delay in both directions in the signals passing therethrough, the total delay being equal to 32 time slots in a 32 time slot time division multiplex arrangement although the delays in the two signal directions may be different. Delaying junctors are necessary so that a signal from the calling subscriber originate in one time slot and arrive at the called subscriber in a different time slot and vice versa, the junctor delaying both the signals from the called to the calling subscriber and the signals from the calling to the called subscriber by the appropriate number of time slots. Since, however, the delays are fixed, a fixed delay junctor may only be used for one predetermined spacing between the time slots of the called and calling subscribers. The variable delay junctors have the same purpose as the fixed delay junctors, i.e. they allow connectionS to be made therethrough between called and calling subscribers using different time slots, but the delays in each direction are variable (although the sum of the two delays still equals one 'frame' which in this case is 32 time slots) so that the junctors are each utilizable for any time slot differences between a called and calling subscriber.

The interrogation marks arrive on the free junctors and are there detected by the junctor supervisory units (part of unit 14, not separately shown). If the called and calling interrogation marks both arrive at a zero delay junctor in the same time slot then that junctor could be used in setting up a signal path between the called and calling subscriber. To detect whether a fixed delay junctor may be used in setting up a path interrogation mark detectors are located at one end of the junctor, i.e. there is a called and a calling detector at one end of the junctor. For a fixed delay junctor to be suitable for use then both of the detectors should detect interrogation marks in the same subscriber.

The variable delay junctors can accommodate any possible required time slot difference by varying their delays and therefore if a variable delay junctor detects the receipt of called and calling interrogation marks from opposite directions then it can be used in the path between the called and calling subscriber.

The cheapest form of junctors are zero delay junctors and normally one of these should be used if any is available. If a zero delay junctor is not available then a fixed delay junctor should normally be used and finally if no other zero or fixed delay junctors are available a variable delay junctor should be used. By this means the required traffic capacity may be provided by the cheapest possible array of junctors.

When, therefore, interrogation is initiated, the junctor selector arrangement is informed and solely zero delay junctors are allowed to "interrupt" the selection arrangement if and as soon as they receive interrogation marks at each end from a called and calling interrogator. By "interrupt" is meant that the junctor indicates to the first selector 16 that it is available for selection for use in setting up the required call. An OR gate in the first selector passes the information to the next selector stage 17 which again includes an OR gate whereby the information passes finally to the final selector 18. The highways between the selector stages are two way working so that interrupts are passed forward from the junctors and the choice can then be passed back over the same path. A period of time after the initiation of interrogation is allowed for all possible paths through the exchange to be found, the period of time being two frames, i.e. two complete time division multiplex blocks. One frame is then sufficient to cover the time necessary for junctor selection which is effected by the arrangement of FIG. 3. FIG. 4 shows in more detailed form one of the selectors 16 of FIG. 3. Each of the junctor selectors 17 and 18 are similar in construction except that they will have seven inputs and associated circuitry instead of the six inputs and associated circuitry of the selector of FIG. 4. The selector comprises a counter 19 which as shown is a three stage counter and is arranged to cyclically count from 0 to 7. The selector has six inputs 20, each of which is fed as one input to a respective one of six AND gates 21. The AND gates 21 each have three other inputs taken one from each of the three stages of the counter 19, some of the connections from the counter including inverting gates (not shown). The outputs of the AND gates 21 are fed each via and inverting gate 30 to one input of a respective two input and gate 22 and also as one input to a single OR gate 23. The output of the OR gate 23 is fed to the counter 19 and the outputs of the AND gates 22 are fed to outputs 24 for the selector unit. The other inputs of the AND gates 22 are all connected to a signal input 25. A further signal input 26 is connected through six inverting gates 27 to the six outputs 24 and finally, the inputs 20 are all connected to an OR gate 28, the output of which is connected to a selector output 29.

When a junctor selection is to be made the junctors which are available for selection send signals to the junctor selector units 16 to which they are connected via selector inputs 20. This signal will then be passed via the OR gate 28 in the first selector 16 to the second stage selector 17. The second stage selector 17 also has a corresponding OR gate therein and it passes the signal on to the final selector 18. When the final selector receives this signal it knows that one or more junctors are available for selection. This selection is carried out by each of the selectors 16, 17 and 18 in the same way. The manner of operation of only one of the selectors, the selector 16 of FIG. 4, will therefore be described.

In the arrangement of FIG. 4, clock signals are fed to the counter 19 via an input not shown and the counter 19 counts sequentially from zero to 7 cyclically. The AND gates 21 are connected to the stages of the counter 19 such that the inputs of each gate in turn will receive enabling signals thereon individually and separately for different counts of the counter, i.e. the first gate will have enabling inputs on its three inputs, at the count of '1' the second gate at the count of '2' and so on. If there is an input present on one of the inputs 20 when the gate 21 to which that input is connected receives its enabling input from the counter 19, then the gate 21 will be opened and an output signal will be passed to the OR gate 23 and thence to the counter 19. The counter will be stopped thereby at that count to maintain the AND gate 21 enabled. The input 25 of the selector is arranged to have a single pulse fed thereto in a specific bit position during a word. If, when that pulse is fed to the input 25 there is an output on one of the AND gates 21 then an output will appear on the respective one of the outputs 24, and the junctor connected thereto will receive the output and know that it has been selected for use on the signal path. In the case of the selectors 17 and 18 it is another selector which receives this signal end which on receipt of the signal carries out its own selection.

As previously described, the first attempt at obtaining a junctor for use in transmission is made using zero delay junctors. If no zero delay junctor is available then none of the selector inputs 20 will receive a signal to be passed on to the final selector 18. If this happens then a signal is applied to the input 26 and this signal passes via the gates 27 to all of the outputs 24. The input is applied to a particular predetermined bit position in a word and the junctor supervisory units are arranged to detect if a signal is received from the selector arrangement during that bit position and on the occurrence of such a detection to cause any fixed delay junctors to set up marks at the inputs to the selector 16 if they are available for use in the setting up on a transmission path. The selector units then make a selection of one of the available fixed delay junctors if any. If none of the fixed delay junctors are available then a selection has to be attempted using the variable delay junctors. In which case, to cause the variable delay junctors to send marks to the selection arrangement, a signal is again applied at input 26, in a different predetermined bit position.

Using this selection arrangement the junctor selector for use is the first one which causes one of the gates 21 to be enabled during a count by the counter 19 so that the junctors are used evenly for traffic. After a selection has been made the counter is stepped on by a count of one so that the same junctor as previously can only be selected if it is the only one available for the setting up of a path.

In the case of the selection arrangement of FIG. 4, the inputs 20 and the outputs 24 lead to the junctor supervisory units. As mentioned, in the selector units 17 and 18 these outputs and inputs lead to the selector units of the previous stage.

If, after trying all three kinds of junctor, no path is found, then the exchange data processor is informed and the processor may instruct the interrogators associated with another call to start their interrogation process, or may initiate a further attempt at setting up the first call.

The junctor selection process may be altered to provide a cheaper circuit but this results in slower selection. In some cases, however, it may be preferable. The alteration consists in omitting the signalling back to the junctors from the selector 18 to the junctors to instruct the next most expensive kind of junctors to present marks should there be no interrupts presented. In this case firstly only zero delay junctors are tried and one frame is allowed per selection to be effected. If no zero delay junctor is available then in the next frame fixed delay junctors are tried and finally, in a third frame variable delay junctors will be tried. This process assumes that if a junctor is available it will be selected within the time of one frame so as to stop the selection process prior to the next junctors being tried.

Once a junctor has been selected, its call supervisory equipment will immediately start sending in two stages path setting signals or marks out to the B switch columns to which the junctor is connected. The first path setting marks will be intended to set up only half of the call path, either the half path between the called subscriber and the junctor or the half path between the calling subscriber and the junctor, but not both half paths at the same time. Two path setting signal codes are used in the arrangement illustrated, the code signal 110 for setting up the half path to the calling equipment and the code signal 101 for setting up the half path to the called equipment. When a path setting mark arrives at the columns of a B switch, the path setting mark will be passed through the 16 crosspoint in the column to which the junctor is connected. These path setting marks are detected and then passed on to the selector and encoding unit 6 associated with the B switch, the unit noting the presence of the path setting mark and also which half of the path is required to be set, i.e. whether it is to a called or calling subscriber. Unit 6 will still be receiving an interrogation mark or marks at its inputs connected to the crosspoint switch row inputs and detects which input or inputs are carrying an interrogation mark corresponding to the path setting mark. The selection of one of the inputs carrying an interrogation mark corresponding to the path setting requirement is effected by a scanning arrangement provided in the encoder 6. This may be in the form of a scanning switch which is stepped by a counter from input to input until the first input with the appropriate interrogation mark is found. The number contained in the counter is then written into the crosspoint column control store for the column containing the path setting mark when the next path setting mark is received from the junctor. On subsequent time division cycles the crosspoint control store sets the connection between the incoming column and the chosen or selected row and the path setting marks are passed on from the B switch to the A switch connected to that row.

When the A switch receives the path setting marks the same setting procedure will be followed as in the case of the B switch and the path setting mark will be passed out to the interrogation equipment.

As soon as the B switch is set for the first half path then the path setting procedure is started for the second half of the path. Thus two frames after the sending of the first path setting mark, the second path setting signals or mark is sent from the junctor supervisory circuit to establish the other half path. This is done in exactly the same way except that the appropriate unit 6 will scan its inputs for a row on which an interrogation mark corresponding to the other half path is being received.

When the path setting mark for the first half path reaches the interrogator, a mark counter is clocked to a count of one. When the counter reaches a count of three, i.e. when three such path setting marks have been received, the interrogator for the other half path should have received its first path setting mark so that the complete path should be ready for checking. To check the path a pattern of digits is sent in the calling and called time slots from the respective calling and called interrogators. The patterns sent should be received on the opposite interrogators after a delay equal to the delay through the exchange. For a call involving time slot changing using fixed delay or variable delay junctors the delay will be up to one frame longer. In the frame after this pattern is sent an inverse pattern will be sent from both ends and if the received patterns correspond on both transmissions then the path is ready and the interrogators inform the executive processor and all the interrogation equipment will be cleared ready for a new interrogation.

I claim:

1. A time division multiplex data transmission arrangement including a switch unit having a plurality of crosspoint matrix switches, each of said switches having in addition to its signal traffic carrying rows an extra row for carrying interrogation signal traffic; and means for generating interrogation signal and for applying these signals to free row inputs of said switches directly connected to devices to be interconnected; and said switch unit further including interrogation code detecting means for detecting the occurrence of an interrogation signal on any row input to one of said plurality of switches and for passing this signal via said extra row to all column outputs of the last said switch which are free whereby the interrogation signals are passed to next switches connected to the switch unit output columns or to junctors connected to those columns such that the signals are passed progressively through the crosspoint switches of the switch unit until they appear via all free paths at the junctors.

2. A time division multiplex data transmission arrangement according to claim 1 including means for feeding interrogation signals to the inputs of the switch unit connected directly to a calling device which differ from those connected to the inputs of a called device such that if a junctor receives the two signals in the appropriate time slots to allow a path to be set up therethrough it can inform supervisory equipment therefor that it is available for use in setting up an interconnecting path.

3. A time division multiplex data transmission arrangement according to claim 2 wherein the means for detecting the occurrence of an interrogation signal on any row input of a matrix switch and for passing this signal via said extra row comprises an interrogation code detector for each input row and a gate to which outputs of all interrogation code detectors are connected, the output of the gate being connected to said extra row and the detectors being responsive to the occurrence of an interrogation code or codes, to pass the code or codes via said gate to the extra row.

4. A time division multiplex data transmission arrangement according to claim 3 including means for supplying different calling and called interrogation codes which can be added or combined while still retaining their individual identities to enable their presence to be detected and if the code detectors detect the presence of both signals said gate adds the two signals and passes the combined signal to said extra row.

5. A time division multiplex data transmission arrangement according to claim 1 including means for providing the interrogation signals in normal information signal carrying digit positions in a digital word used in carrying traffic through the transmission arrangement, the digital word having in addition to information signal traffic digit positions an additional digit position which is utilized solely for providing control and identifying information within the switch unit, a predetermined one of the binary digits in this additional digit position indicating that the succeeding traffic digits contain an interrogation signal or mark.

6. A time division multiplex data transmission arrangement according to claim 1 including junctor selection means, the junctor selection means comprising means for passing availability mark signals from junctors utilizable in a path to a selector arrangement comprising two or more stages of selector units the final stage of which comprises a single selector unit, OR-gate means for gating the availability marks from the junctors through the stages of selector units until they reach said single selector unit which is arranged such that when it receives a junctor availability mark it scans the inputs thereto and selects the first input on which it detects an available mark, locks on this input and sends to a selector to which that input corresponds an indication that it has been chosen, this process being repeated at each of the stages of selector units until supervisory equipment for an individual junctor receives notification that it has been chosen for use in the interconnection path.

7. A time division multiplex data transmission arrangement according to claim 6, including means for putting up only marks of zero delay junctors for a first period of time, then if no zero delay junctors put up a mark, for putting up for a second period of time marks of fixed delay junctors and again, if no fixed delay junctor puts up a mark, for putting up marks of variable delay junctors in a third period of time, means responsive to the appearance of a mark in any of the periods of time for making junctor selection prior to the occurrence of the next time period and means for inhibiting the putting up of any subsequent marks due in a next time period, whereby firstly zero delay junctors are considered, then fixed delay junctors are considered and finally variable delay junctors are considered.

8. In a time division data transmission system for transmitting data at a selected time division rate within successive time frames, including switch means for establishing pairs of transmission paths at said selected rate, a plurality of junctors for connecting said pairs of paths to establish communication between pairs of devices, the improvement comprising:

said switch means including at least one cross joint matrix switch means having, for the establishment of one transmission path of each pair, *m* input rows, an extra input row and *m* output columns wherein such rows and columns form part of the cross point matrix, said cross point matrix switch means also having, for the establishment of the other transmission path of each pair, *m* output rows and *m* input columns wherein such rows and columns form another part of the cross point matrix; and means responsive to a signal indicating desired completion of a new pair of transmission paths at any of said *m* input rows which are free during a time slot of a time frame for producing an interrogation signal input on said extra input row and passing it to all of said output columns which are free during such time slot.

9. In a time division data transmission system as defined in claim 8 further including means responsive to said interrogation signal passed to said free output columns for selecting a particular junctor to connect a new pair of transmission paths.

10. In a time division data transmission system as defined in claim 8 wherein said switch means also includes a second cross point matrix switch means in series with and identical to the first mentioned cross point matrix switch means, the output columns of the first matrix switch means being connected at the input rows of the second matrix switch means, the output rows of said second matrix switch means being connected as the output columns of the first matrix switch means, and the output columns and input rows of said second matrix switch means being connectable by said junctor means; and means responsive to the occurrence of said interrogating signal passed to the output columns of said first matrix switch means for passing it through the extra input row of said second matrix switch to all of said output columns thereof which are free during said time slot.

11. In the time division data transmission system as defined in claim 10 wherein said switch means further includes other first cross point matrix switch means and other second cross point matrix switch means, said cross point matrix switch means being connected so that one of each said pair of transmission paths may be established through any one of said first matrix switch means and any of said second matrix switch means and the other of each said pair of transmission paths may be established through any one of said second matrix switch means and any of said first matrix switch means.

12. In a time division data transmission system as defined in claim 11 including means responsive to a signal indicating availability of completion of a new pair of transmission paths at any of said output rows of said first cross point matrix switch means which are free for producing a second interrogation signal at said extra input row of the associated first matrix switch means and passing it to all free output columns thereof; and means responsive to the first and second interrogation signals for selecting a particular junctor to complete the new transmission path pair.

13. In a time division data system as defined in claim 12 including zero delay junctors and time delay junctors, the last-mentioned means being effective to select a zero delay junctor when available so that the new transmission path pair is completed in the same time slot, and otherwise to select a time delay junctor so that the transmission paths of the new pair are not coincidental in time.

14. In a time division data transmission system for transmitting data at a selected time division rate within successive time frames, the combination of:

an input distribution frame having a plurality of input conductors and a plurality of output conductors; a junctor distribution frame having a plurality of output conductors and a plurality of input conductors;

junctor means for selectively connecting particular ones of said output conductors of said junction distribution frame to particular ones of said input conductors thereof; and switch means for establishing time division communication paths between said input conductors of said input distribution frame and said output conductors of said junctor distribution frame and between said input conductors of said junctor distribution frame and said output conductors of said input distribution frame, said paths being established at said selected time division rate within successive time frames, said switch means comprising at least one cross point matrix switch means having *m* input rows connected to input conductors of said input distribution frame, an extra input row and *m* output columns wherein such rows and columns form part of the cross point matrix, and means responsive to the occurrence of a unique interrogation signal at any of said *m* input rows during a free time slot of a time frame of any such row for producing an interrogation signal input on said extra input row and passing it to all of said output columns which are free during such time slot.

15. In a time division data transmission system for transmitting data at a selected rate during successive time frames and in which a plurality of pairs of devices are already in communication and a plurality of further pairs of devices can be accommodated for communication therebetween, the combination of:

switch means for establishing a number of pairs of transmission paths equal to all of the pairs of devices which are already in communication and all of said further pairs of devices;

junctor means for connecting said pairs of transmission paths associated with said pairs of devices which are already in communication to complete the time division communication between said devices already in communication and for connecting any of those pairs of transmission paths which are free; and means for passing interrogation signals through all free paths of said switch means to establish time division communication between a further pair or pairs of devices through a free pair or pairs of transmission paths.

16. In a time division data transmission system as defined in claim 15 wherein said means for passing passes a calling device interrogation signal and a called device interrogation signal through said switch means.

17. In a time division data transmission system according to claim 16 wherein said junctor means includes zero time delay junctors and time delay junctors; and means responsive to said calling device interrogation signal and said called device interrogation signal for selecting a zero time delay junctor when said interrogation signals are available at the same time and, when not available at the same time, to select a time delay junctor which establishes a time delay corresponding to the time delay between such signals.

* * * * *